(12) United States Patent
Hou et al.

(10) Patent No.: US 10,543,517 B2
(45) Date of Patent: Jan. 28, 2020

(54) PARTICLE FOR TREATMENT AND REPAIRING OF SOIL CONTAMINATION AND REPAIRING METHOD

(71) Applicant: QIUXIANG NEW ECOLOGICAL AGRICULTURE TECHNOLOGY (JIANGSU) CO., LTD., Suzhou (CN)

(72) Inventors: Liwei Hou, Suzhou (CN); Yufang Wei, Suzhou (CN)

(73) Assignee: QIUXIANG NEW ECOLOGICAL AGRICULTURAL TECHNOLOGY (JIANGSU) CO., LTD., Suzhou (CN)

(*) Notice: Subject to any disclaimer, the term of this patent is extended or adjusted under 35 U.S.C. 154(b) by 83 days.

(21) Appl. No.: 15/750,835

(22) PCT Filed: Aug. 5, 2016

(86) PCT No.: PCT/CN2016/000429
§ 371 (c)(1),
(2) Date: Feb. 6, 2018

(87) PCT Pub. No.: WO2017/020536
PCT Pub. Date: Feb. 9, 2017

(65) Prior Publication Data
US 2018/0221926 A1  Aug. 9, 2018

(30) Foreign Application Priority Data
Aug. 6, 2015  (CN) .......................... 2015 1 0478068

(51) Int. Cl.
*B09C 1/08*  (2006.01)
*C05D 3/00*  (2006.01)
(Continued)

(52) U.S. Cl.
CPC .............. *B09C 1/08* (2013.01); *B09C 1/10* (2013.01); *C05D 1/00* (2013.01); *C05D 3/00* (2013.01); *B09C 2101/00* (2013.01)

(58) Field of Classification Search
CPC ......... B09C 1/08; B09C 1/10; B09C 2101/00; C05D 3/00; C05D 1/00
See application file for complete search history.

(56) References Cited

U.S. PATENT DOCUMENTS 5,306,392 A * 4/1994 Mita ...................... D21C 3/006
162/76
6,790,429 B2 * 9/2004 Ciampi .................. C01G 49/00
423/594.1
(Continued)

FOREIGN PATENT DOCUMENTS

CN   102069089 A   5/2011
CN   105080960 A   11/2015
RU     2379136 C2   1/2010

OTHER PUBLICATIONS

Huang, Ling et al., "Solidification Effect of Two Iron-containing Materials on Arsenic in Sediment", Journal of Soil and Water Conservation, vol. 28, No. 1, Feb. 28, 2014 (Feb. 28, 2014), the whole document.
(Continued)

*Primary Examiner* — Benjamin F Fiorello
*Assistant Examiner* — Edwin J Toledo-Duran
(74) *Attorney, Agent, or Firm* — Gokalp Bayramoglu

(57) ABSTRACT

A particle for treatment and repair of soil contamination is mainly composed of potassium ferrate and an inorganic cementitious material. The inorganic cementitious material is a powdery air-hardening or hydraulicity inorganic cementitious material. The potassium ferrate and the inorganic cementitious material are mixed according to the mass fraction of 1:5-50. After mixing is carried out, the particle with the particle diameter ranging from 2 mm to 5 mm is formed by means of vibration of a vibration screen, the particle is wrapped by a water-soluble film, and the water-soluble film is heated to be shrunk and then is closely attached to the outer surface of the particle. Also disclosed is a method for repairing soil by using the particle. When the particle is mixed with an ozone water solution is adopted.

16 Claims, 2 Drawing Sheets

(51) Int. Cl.
*C05D 1/00* (2006.01)
*B09C 1/10* (2006.01)

(56) References Cited

U.S. PATENT DOCUMENTS

| | | | | |
|---|---|---|---|---|
| 2005/0271575 A1* | 12/2005 | Ciampi | ............ | C01G 49/0081 |
| | | | | 423/594.2 |
| 2010/0139346 A1* | 6/2010 | Burnham | ................ | C05F 5/008 |
| | | | | 71/12 |
| 2011/0154873 A1* | 6/2011 | Burnham | ................ | C05B 17/00 |
| | | | | 71/8 |
| 2011/0268672 A1* | 11/2011 | Monzyk | ............... | A61K 31/295 |
| | | | | 424/52 |
| 2014/0137614 A1* | 5/2014 | Burnham | ................ | C05B 17/00 |
| | | | | 71/8 |
| 2015/0101374 A1* | 4/2015 | Burnham | ................ | C05B 17/00 |
| | | | | 71/8 |
| 2017/0058181 A1* | 3/2017 | Frantz | .................... | C09K 8/467 |

OTHER PUBLICATIONS

Han, Longye, "Study on Oxidation Treatment of Phenol Contaminated Soil Using Potassium Ferrate", Dissertation for the Master Degree in Engineering, Mar. 31, 2011 (Mar. 31, 2011), the whole document.

* cited by examiner

Step 1:

1.1 Apply the particles uniformly on a surface of a soil layer.

1.2 Spraying ozone solution on the surface of the soil layer;

1.3 Deply turn the soil layer by using a rotary tillage equipment; and detect soil moisture content.

Step 2:

2.1 At least 48 hours after completion of the step 1, apply compound microbial fertilizer and compound microbial strain to the soil layer, wherein the compound microbial fertilizer and compound microbial strain are filled in water-soluble capsules; and 2.2 Detect soil moisture content of 5cm-deep soil layer:

If the moisture content is less than 15 %, then water to make the moisture content of 15%, plow the soil so that the compound microbial fertilizer, the microbial compound bacteria and the soil are fully mixed.

If the moisture content is higher than 15%, directly plow the soil so that the compound microbial fertilizer, the compound microorganisms bacteria and the soil are fully mixed, played a continuous repair of contaminated soil.

FIG. 2

PARTICLE FOR TREATMENT AND REPAIRING OF SOIL CONTAMINATION AND REPAIRING METHOD

CROSS REFERENCE TO RELATED APPLICATIONS

This application is the national phase entry of International Application No. PCT/CN2016/000429, filed on Aug. 5, 2016, which is based upon and claims priority to Chinese Application No. 201510478068.5, filed on Aug. 6, 2015, the entire contents of which are incorporated herein by reference.

TECHNICAL FIELD

The invention relates to a particle for treatment and repairing of soil contamination, and to a repairing method, and relates to the field of treatment and remediation of various contaminated soils used in industrial and agricultural fields. More specifically, the present invention relates to a method and application of combined chemical and in situ immobilization oxidation and microorganism treatment for the repair of contaminated soils. The invention also relates to the simultaneous treatment of viruses, bacteria, fungi, spores and other diseases in the soil; and the use of soil-borne diseases and stubble diseases in the prevention and treatment of diseases. The soil quality after the repair meets the requirements of the second standard value of China's "soil environmental quality standards" (GB 15618-1995).

BACKGROUND OF THE INVENTION

In recent years, due to population growth, rapid industrial development, solid waste continuously piled up and dumped onto the soil surface, harmful waste water continuously penetrates into the soil, exhaust emissions from vehicles, the atmosphere of harmful gases and fly ash continuously with the rain landed in the soil. With the improvement of agrochemical level, a large number of chemical fertilizers and pesticides are scattered into the environment, resulting in more and more opportunities for soil to suffer from pollution, and the degree is becoming more and more serious. Under the influence of soil erosion and wind erosion, pollution area continues to expand.

In 2010, nearly 20 million hectares of cultivated land (200,000 square kilometers) are contaminated by organic and heavy metals in China, and this is increasing year by year. The annual area of organic pesticide use is 280 million hectares (2.8 million square kilometers). As a result, the country's agricultural production has already been reduced by more than 13 million tons. Economic losses due to other types of pollution such as pesticides and organic pollutants, radioactive contaminants and pathogenic bacteria, are hard to estimate. Therefore, all substances that interfere with the normal functions of the soil, reduce the yield and quality of crops, and indirectly affect human health through food, vegetables and fruits are called soil pollutants.

When the soil contains too much harmful substances, exceeding the self-purification capacity of the soil, this leads to soil composition, structure and function of the soil changes: microbial activity is inhibited, harmful substances or their decomposition products gradually accumulate in the soil, through the "soil→plant→human body ", or through the" soil→water→human body" indirectly absorbed by the body to reach the extent of endangering human health, that is, soil pollution.

A variety of contaminated soil, relates to soil heavy metal pollution, soil organic pollution, soil pollution, soil microbial contamination, soil acid rain pollution.

The heavy metal pollution in soils mainly includes elements of significant biological toxicity such as mercury (Hg), cadmium (Cd), lead (Pb), chromium (Cr) and arsenic (As), Copper (Cu), nickel (Ni) and other elements; mainly from pesticides, wastewater, sludge and atmospheric deposition. For example, mercury is mainly from mercury-containing wastewater; cadmium and lead are mainly from smelting emissions and vehicle emissions. Arsenic (As) is widely used as insecticides, fungicides, rodenticides and herbicides.

Soil organic pollution mainly includes more than 120 varieties of pesticides. Organic pesticides according to their chemical properties can be divided into organic chlorine pesticides, organic phosphorus pesticides, carbamates and phenoxy alkanoates pesticides. The first two types of pesticides are extremely toxic, and organic chlorine pesticides are not easily degraded in the soil, causing heavy pollution to the soil. Although organophosphate pesticides are easily degraded in the soil, they are also widely contaminated due to heavy use. China's average per hectare of farmland pesticide application is 13.9 kg, about 1 times higher than in developed countries, the utilization rate is less than 30%, causing a large area of soil pollution.

The disadvantages of soil chemical fertilizer pollution includes: increasing soil heavy metals and toxic elements, promoting soil acidification, leading to nutrient imbalances and nitrate accumulation, soil structure destruction, and microbial activity reduction, etc. This causes a series of problems to the sustainable development of agriculture. To increase production, the application of fertilizers is an important choice for most farmers. Therefore, our country has become the country that has the largest number of chemical fertilizers in the world.

Soil pathogenic microbial contamination includes: pathogens, bacteria and viruses; excrements from humans and animals and sewage for irrigation (untreated domestic sewage, especially hospital sewage), etc. If people directly contact the soil containing pathogenic microorganisms, this may have an impact on health. If eating vegetables, fruits contaminated by soil, this means indirect contamination.

Soil acid rain pollution mainly includes: industrial emissions of SO2, NO and other harmful gases react in the atmosphere to form acid rain, natural precipitation into the soil, causing soil acidification.

Soil remediation: refers to the use of physical, chemical or biological methods to fix, transfer, absorption, degradation or conversion of contaminated soil in the site, to reduce its content to an acceptable level, or to convert toxic and harmful pollutants into harmless substances. The repair method is divided into two kinds of methods: repairing in situ and ectopic repair. Ectopic repair involves excavation and soil transport, this not only will undermine the original soil structure, there will be secondary pollution problems.

At present, the technology to repair contaminated soil include the following:

Phytoremediation method. This Is recognized as an ideal soil treatment in situ technology, but there are obvious shortcomings: short plants, low biomass, slow growth and long growth cycle; phytoremediation is also subject to environmental conditions such as soil type, temperature, humidity and nutrition. Phytoremediation takes three to five years, meaning that the time it takes for the soil to expire is three to five years, affecting economic efficiency. In addition, the cost of phytoremediation is high, reaching about 200 Chinese Yuan per cubic meter of soil, and the cost of remediation per mu is as high as 80,000 to 100,000 Chinese Yuan. The restoration cost per hectare of soil reaches 120 million to 150 million Yuan. The high cost is simply unbearable to the local government and peasants.

Chemical leaching method. This means use of chemical agents such as surfactants, pickling agents, so that the heavy metals in the soil after washing out the wastewater treatment. This method is not only very costly and far higher than phytoremediation, but also brings new pollutants, such as surfactants and pickling agents, into the soil, and the physical structure of the soil can be greatly affected. Become a new source of pollution.

Guest soil method. The contaminated soil is buried more than a meter deep in original place or dug up and transported away, and then backfilled with clean soil. For the remediation of large-scale contaminated soil, not only a large amount of manpower, material and financial resources are needed (repairing acres of contaminated land leads to millions of dollars), but also the source of clean soil is hard to guarantee. In addition, the guest soil method easily destroys the soil structure, leading to soil fertility and micro-ecological environment decline, and the transfer of the contaminated soil can easily lead to the release of organic and heavy metals, the pollution is transferred into the groundwater, resulting in new groundwater pollution.

Microbial leaching method. Organic matter and heavy metals are washed out by adding a microbial flora to the soil, wherein the microbial flora can collect the organic matter and heavy metals. This method is not only high in cost but also consumes a large amount of microbial strain, which is difficult to operate due to the difficulty of collecting microbial eluent for a large area of soil pollution.

Electrochemical method. In the soil, through the action of current, water-soluble heavy metal ions are enriched to the cathode surface. At present the technology is only in the laboratory to explore. Due to the distance of the current effect is too small, and the area of polluted land is too large, this technology is difficult to implement in engineering, and regardless of its high operating costs unbearable.

In summary, how to develop practical and applied to a variety of contaminated soil comprehensive repair methods and techniques have become the future of soil pollution control new problems.

SUMMARY OF THE INVENTION

The present invention is directed against a variety of contaminated soil treatment and repair of existing high cost, the scope of application is small, complex operation, resulting in secondary pollution and damage to the soil microbial environment and other issues, the invention is suitable for a variety of contaminated soil Chemical contaminants in situ and combined with immobilization of microorganisms in the treatment and repair of soil particles and repair methods.

The object of the present invention is achieved by the following technical solutions:

A particle for treatment and repairing of soil contamination, the composition of which is mainly composed of potassium ferrate and an inorganic cementitious material, wherein the inorganic cementitious material is powdery air-hardening or hydraulic inorganic cementitious material, the potassium ferrate and the inorganic cementitious material are mixed according to a mass fraction of 1: 5-50, the mixture is aggregated into particles and then shaken through a shaker to form particles with a diameter of 2-5 mm, the particles are then coated with water-soluble films and the water-soluble films are heated to cause the water-soluble films to closely adhere to the outer surface of the particles when they are thermally shrunk, alternatively, the particles are packaged by water-soluble capsules.

The particle for treatment and repairing of soil contamination according to claim 1, wherein the inorganic cementitious material is selected from quicklime powder, slaked lime powder or gypsum, or a mixture of any one or more of quicklime powder, slaked lime powder or gypsum.

The inorganic cementitious material is a cement powder.

The potassium ferrate is a powder, and the powder has a particle size of at least 300 mesh.

A Method for manufacturing particles for treatment and repairing of soil contamination, wherein the potassium ferrate powder and the inorganic cementitious material powder are mixed according to a set proportion, and stirred with a mixer to form a granular mixture, and then the mixture goes through a shaker to sieve particles with a diameter of 2-5 mm, and by using a film packaging machine, each particle is packaged in a water-soluble film, and then the packaged particles are heated in a heating furnace to heat-shrink the water-soluble film; or the particles are packaged in water-soluble capsules. Preferably, the potassium ferrate powder and inorganic cementitious material powder are mixed and stirred in an air environment with a humidity of 15%-25%.

Further, during the shaking process, two layers of screens are provided on the shaker, with the first layer of screen located in the upper part and placed horizontally, the second layer of screen located in the lower part and inclined at 10-15 degrees, the first layer of screen mesh 5 mm×5 mm, the second layer of screen mesh 2 mm×2 mm, so that the particles with a diameter smaller than 5 mm go through the first layer of screen, and the particles with a diameter smaller than 2 mm go through the second layer of screen.

The second layer of screen is connected to a collection device.

The second layer of the screen is funnel-shaped, and the bottom thereof is provided with 2 mm×2 mm holes, the bottom discharges particles.

The second layer of screen is connected with a vibrating device, and works under vibration.

A method for using the particle for treatment and repairing of soil contamination according to claims 1-4, comprising:

step 1, applying the particles for treatment and repairing of soil contamination uniformly on the surface of the soil layer; spraying ozone solution on the surface of the soil layer; and then deeply turning the soil layer by using a rotary tillage equipment, so that the particles for treatment and repairing of soil contamination are fully contacted with the contaminated soil; and detecting the soil moisture content;

step 2, waiting at least 48 h after completion of step 1, applying compound microbial fertilizer and compound microbial strain to the soil layer, the compound microbial fertilizer and compound microbial strain are filled in water-soluble capsules, and detecting soil moisture content of 5 cm deep soil layer, if the moisture content is less than 15%, then watering to make the moisture content of 15%, plowing the soil so that the compound microbial fertilizer and microbial compound bacteria and soil are fully mixed, if the moisture content is higher than 15%, directly plowing the soil so that the compound microbial fertilizer and the compound microorganisms Bacteria and soil are fully mixed, played a continuous repair of contaminated soil.

The mixture of potassium ferrate and inorganic cementitious material fully contact with the soil, in a certain degree of humidity, plays the role of fixed oxidation in situ.

The compound microbial fertilizer is a result of microbial fermentation of manure, marsh or algae residue, medicine residue, distiller's grains, crop stalks, fruit and vegetable waste or/and food residue.

The compound microbial strain is a mixed fermentation broth of water, EM bacteria, and one or more of the soybeans, soybean meal, fruits or vegetables.

The steps 1 and 2 require that the soil temperature be between 5° C. and 35° C. and the daytime maximum atmospheric temperature should be between 25° C. and 35° C.

Prior to the step 2, the surface of the soil is heated with a high-temperature device so that the surface temperature of the soil reaches at least 40 degrees Celsius for at least 10 minutes, this can further promote the decomposition of residual ozone in the soil to ensure that the ozone does not remain, to prevent oxidation of compound microbial fertilizer and compound microbial strain.

The present invention provides repair particles and repair methods, from the soil environment, soil desertification, PH value and climatic conditions, more practical.

The present invention provides repair particles and repair methods, which can effectively reduce and reduce the pollution of organic matter and heavy metals on the soil, but also to solve the soil diseases such as viruses, fungi, bacteria, spores and non-toxic, no residue, No teratogenicity, no carcinogenic, no mutagenicity, no secondary pollution.

The present invention provides repair particles and repair methods, with a multi-purpose method, the operation of new, high efficiency and environmental protection, low cost, time saving, wide range of applications, easy to promote and other advantages; it can continue to strengthen the repair of contaminated soil. The method overcomes the shortcomings of traditional chemical and biological remediation, takes both economic and environmental benefits into consideration, and can be applied to a large area for remediation of various contaminated soils.

BRIEF DESCRIPTION OF THE DRAWINGS

FIG. 2 shows a flow chart of a method for using particles for treatment and repair of soil contamination according to the present disclosure.

DETAILED DESCRIPTION OF THE EMBODIMENTS

The First Embodiment

Figure 1:
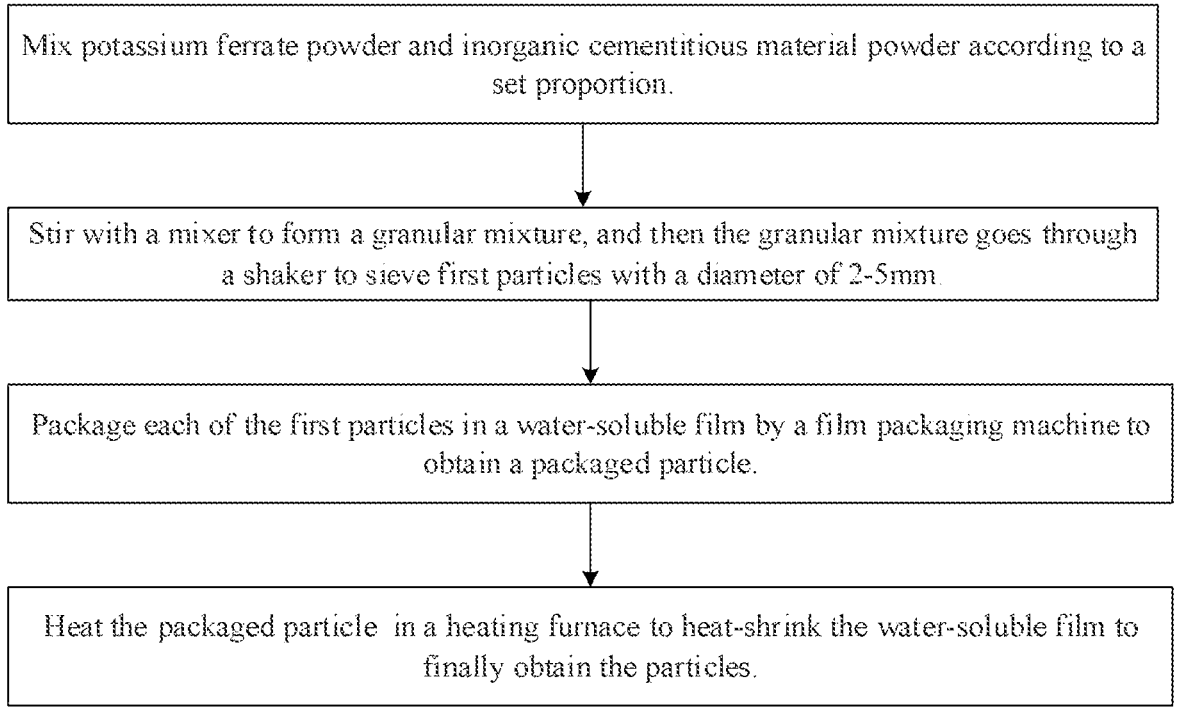
FIG. 1 shows a flow chart of a method for manufacturing particles according to the present disclosure.

In the first embodiment of the present invention, the particle for treatment and repairing of soil contamination, is mainly composed of potassium ferrate and an inorganic cementitious material (inorganic gelled material). The inorganic cementitious material is a powdery air-hardening (or non-hydraulic) inorganic cementitious material or a powdery hydraulic inorganic cementitious material. The potassium ferrate and the inorganic cementitious material are mixed according to the mass fraction of 1:5, stirred in an air environment with a humidity of at least 15%, the mixture is aggregated into particles and then shaken through a shaker to form particles with a diameter of 2 mm. The particles are then coated with water-soluble films and the water-soluble films are heated to cause the water-soluble films to closely adhere to the outer surface of the particles when they are thermally shrunk. Alternatively, the particles are packaged by water-soluble capsules.

The inorganic cementitious material is a quick lime powder.

The potassium ferrate is a powder, and the powder has a particle size of 300 mesh.

The Second Embodiment

In the second embodiment of the present invention, the particle for treatment and repairing of soil contamination, is mainly composed of potassium ferrate and inorganic cementitious material. The inorganic cementitious material is a powdery air-hardening or hydraulic inorganic cementitious material. The potassium ferrate and the inorganic cementitious material are mixed according to a mass ratio of 1:20, stirred in an air environment with a humidity of at least 16%, the mixture is aggregated into particles and then shaken through a shaker to form particles with a diameter of 3 mm. The particles are then coated with water-soluble films and the water-soluble films are heated to cause the water-soluble films to closely adhere to the outer surface of the particles when films are thermally shrunk. Alternatively, the particles are packaged in water-soluble capsules.

The inorganic cementitious material is a mixture of quick lime powder and hydrated lime powder mixing, mixing ratio of 1:1.

The potassium ferrate is a powder, and the powder has a particle size of 400 mesh.

The Third Embodiment

In the third embodiment of the present invention, the particle for treatment and repairing of soil contamination, is mainly composed of potassium ferrate and inorganic cementitious material. The inorganic cementitious material is a powdery air-hardening or hydraulic inorganic cementitious material. The potassium ferrate and the inorganic cementitious material are mixed according to a mass ratio of 1:50, and stirred in an air environment with a humidity of at least 17% to coagulate the mixture into particles and then vibrated through a shaker to form particles with a diameter of 5 mm. The particles are then coated with water-soluble films and the water-soluble films are heated to cause the water-soluble films to closely adhere to the outer surface of the particles when they are thermally shrunk. Alternatively, the particles are packaged in water-soluble capsules.

The inorganic cementitious material is preferably a cement powder.

The potassium ferrate is a powder, and the powder has a particle size of 500 mesh.

The Fourth Embodiment

In the fourth embodiment of the present invention, the particle for treatment and repairing of soil contamination, is mainly composed of potassium ferrate and inorganic cementitious material, wherein the inorganic cementitious material is a powdery air-hardening or hydraulic inorganic cementitious material. The potassium ferrate and the inorganic cementitious material are mixed according to a mass ratio of 1:40, stirred in an air environment with a humidity of at least 18%, the mixture is aggregated into particles and then shaken through a shaker to form particles with a diameter of 4.5 mm. The particles are then coated with water-soluble films, and the water-soluble films are heated to cause the water-soluble films to closely adhere to the outer surface of the particles when they are thermally shrunk. Alternatively, the particles are packaged in water-soluble capsules.

The inorganic cementitious material is preferably gypsum powder.

The potassium ferrate is a powder, and the powder has a particle size of 350 mesh.

In the embodiments 1-4, the water-soluble capsule refers to a capsule shell made of a water-soluble material, which is hydrophilic and dissolves in water.

At the same time, in the embodiments 1-4, the air humidity should not exceed 25%, which would otherwise result in excessive water absorption affecting the performance of the water-soluble capsule or water-soluble film in the following process. Proper air humidity is beneficial to promote the agglomeration of potassium ferrate and inorganic cementitious material into particles, and to facilitate a more uniform particle size of the particles and easy control of the moisture content in the particles.

The Fifth Embodiment

A method for manufacturing the particle for treatment and repairing of soil contamination: the potassium ferrate powder and the inorganic cementitious material powder are mixed according to the preset ratio and stirred with a stirrer to form a granular mixture, which is then sieved through a shaker to sieve particles having a particle size of 2 to 5 mm, and each particle is coated with a water-soluble film by means of a film packer. The packaged particles are then heated in a heating furnace to cause the water-soluble film to thermally shrink, or the sieved particles are packaged in water-soluble capsules.

During the screening process, two layers of screens are provided on the shaker, with the first layer of screen located in the upper part and placed horizontally, the second layer of screen located in the lower part and inclined at 10-15 degrees. The first layer of screen mesh 5 mm×5 mm, the second layer of screen mesh 2 mm×2 mm, so that the particles with a diameter smaller than 5 mm go through the first layer of screen, and the particles with a diameter smaller than 2 mm go through the second layer of screen.

The second layer of screen is connected to a collection device.

The second layer of the screen is funnel-shaped, and the bottom surface is provided with 2 mm×2 mm holes, the bottom of the funnel discharge particles which are collected by the collecting device. The remaining particles are recycled by other devices and reinstalled into a stirrer.

The second layer of screen or mesh is connected with a vibrating device, and further, when the second layer of screen is funnel-shaped, the bottom of the funnel is connected with the collection device through a flexible tube so that the particles are collected when the second layer of screen is being vibrated.

Embodiment VI

The method for remediation of soil pollution comprises:
Step 1, applying the particles for treatment and repairing of soil contamination uniformly on the surface of the soil layer; spraying ozone solution on the surface of the soil, so that the moisture content of the soil layer of 5 cm depth reaches 40%, preferably 50%; and then deeply turning the soil layer by using a rotary tillage equipment, so that the particle for treatment and repairing of soil contamination are fully contacted with the contaminated soil; and detecting the soil moisture content. According to the specific conditions of water facility, flood irrigation, spraying, watering, drip irrigation, etc., are used to fix soil pollutants and heavy metals. The ozone water solution is a saturated solution, which can not only quickly dissolve the water-soluble film of the particles, enable the particles to work quickly, and also remove the bacteria in the soil and prevent pests and diseases. Ozone itself has a short half-life, after the rapid oxidation, ozone will react to generate oxygen, will not cause secondary pollution to the soil.

Step 2, waiting 48 h after completion of step 1, apply the water-soluble capsules to the soil, the water-soluble capsules are filled with compound microbial fertilizer and compound microbial strain, and soil moisture content of 5 cm deep soil are detected, if the moisture content is less than 15%, then watering to make the moisture content of 15%, plowing the soil so that the compound microbial fertilizer and microbial compound bacteria and soil fully mixed, if the moisture content is higher than 15%, directly plowing the soil so that compound microbial fertilizer and compound microorganisms Bacteria and soil fully mixed, played a continuous repair of contaminated soil.

The compound microbial fertilizer is microbial fermentation of manure, marsh or algae residue, medicine residue, distiller's grains, crop stalks, fruit and vegetable waste or/and food residue.

The compound microbial strain is a mixed fermentation broth of water, EM bacteria, and one or more of the soybeans, soybean meal, fruits or vegetables.

Steps 1 and 2 require that the soil temperature be between 5° C. and 35° C. and the daytime maximum atmospheric temperature should be between 25° C. and 35° C. so that ozone can be quickly acted upon at relatively high temperatures, then quickly decompose to reduce residue.

Further, prior to the step 2, the surface of the soil is heated with a high-temperature device so that the surface temperature of the soil reaches at least 40 degrees Celsius for at least 10 minutes. This can further promote the decomposition of residual ozone in the soil to ensure that the ozone does not remain, to prevent microbial oxidation of compound microbial fertilizer and microbial compound.

48 hours after the completion of water injection, opening the film which covers the soil. To the contaminated soil, evenly sprinkle water-soluble capsules filling compound microbial fertilizer and compound microbial strain; deeply turning the soil layer so that compound microbial fertilizer and microbial compound liquid full contact with the soil; continue to strengthen the remediation of contaminated soil. Compound microbial fertilizer usage: 50 g/m$^2$-5000 g/m$^2$; compound microbial strain usage: 1 g/m$^2$-50 g/m$^2$.

Sampling analysis: 7-10 days after the remediation of contaminated soil, the organic pollutant is reduced by 90% and the heavy metal contaminant is solidified by 60%, and is reduced to a low-priced fixed sediment or mineral, losing its bioavailability, the soil quality after the repair meets the requirements of the second standard value of China's "soil environmental quality standards" (GB 15618-1995).

For the repair process provided by the present invention, 24 h soil temperature should be in the range of 5° C.–35° C., cloudy, foggy weather is better.

The foregoing is only the specific embodiments of the present invention, therefore, the protection scope of the present invention should be subject to the scope of protection of the claims shall prevail. Meanwhile, the above embodiments of the present invention are merely examples for illustrating the present invention clearly, and the protection scope of the present invention is not limited thereto. Any person skilled in the art will understand the above.

What is claimed is:

1. Particles for treating and repairing soil contamination by applying the particles on contaminated soil, comprising potassium ferrate and an inorganic cementitious material, wherein the inorganic cementitious material is a powdery air-hardening or hydraulic inorganic cementitious material, the potassium ferrate and the inorganic cementitious material are mixed according to a mass fraction of 1:5-50, the mixture is aggregated into first intermediate particles and then shaken through a shaker to obtain second intermediate particles with a diameter of 2-5 mm, each of the second intermediate particles is then coated with a water-soluble film and the water-soluble film is heated to cause the water-soluble film to closely adhere to the outer surface of the each of the second intermediate particles when the water-soluble film is thermally shrunk to finally obtain the particles, wherein the particles are fully contacted with contaminated soil for the treatment and repair of the soil contamination.

2. The particles according to claim 1, wherein the inorganic cementitious material is one or more selected from the group consisting of quicklime powder, slaked lime powder, gypsum, and a cement powder.

3. The particles according to claim 1, wherein the potassium ferrate is in the form of powder having a particle size of at least 300 mesh.

4. A method for manufacturing particles for treating and repairing soil contamination by applying the particles on contaminated soil, comprising:
   mixing potassium ferrate powder and inorganic cementitious material powder according to a set proportion, and stirring with a mixer to form a granular mixture, and then the granular mixture goes through a shaker to sieve intermediate particles with a diameter of 2-5 mm;
   using a film packaging machine, packaging each of the intermediate particles in a water-soluble film to obtain a packaged particle and then the packaged particle is heated in a heating furnace to heat-shrink the water-soluble film to finally obtain the particles
   wherein, the particles are fully contacted with contaminated soil for the treatment and repair of the soil contamination.

5. The method according to claim 4, wherein, during the sieving process, the shaker is provided with two layers of screens, the first layer of screen being located in the upper position and placed horizontally, the second layer of screen being located in the lower position and inclined at 10-15 degrees, the first layer of screen meshes 5 mm×5 mm, the second layer of screen meshes 2 mm×2 mm, or
   the second layer of the screen is funnel-shaped, and the bottom thereof is provided with 2 mm×2 mm holes, the bottom discharges the intermediate particles.

6. The method according to claim 5, wherein the second layer of screen is connected to a vibrating device.

7. The method according to claim 5, wherein the second layer of screen is connected to a collection device.

8. A method for using particles for treatment and repair of soil contamination, comprising:
   step 1, applying the particles for treatment and repair of soil contamination uniformly on a surface of a soil layer; spraying ozone solution on the surface of the soil layer; and then deeply turning the soil layer by using a rotary tillage equipment, so that the particles for treatment and repair of soil contamination are fully contacted with the contaminated soil; and detecting the soil moisture content;
   step 2, waiting at least 48 hours after completion of step 1, applying compound microbial fertilizer and compound microbial strain to the soil layer, wherein the compound microbial fertilizer and compound microbial strain are filled in water-soluble capsules, and detecting soil moisture content of 5 cm-deep soil layer, if the moisture content is less than 15%, then watering to make the moisture content of 15%, plowing the soil so that the compound microbial fertilizer, the microbial compound bacteria and the soil are fully mixed, if the moisture content is higher than 15%, directly plowing the soil so that the compound microbial fertilizer, the compound microorganisms bacteria and the soil are fully mixed, played a continuous repair of contaminated soil;
   wherein, the particles for treatment and repair of soil contamination, comprises potassium ferrate and an inorganic cementitious material; wherein the inorganic cementitious material is a powdery air-hardening or hydraulic inorganic cementitious material; the potassium ferrate and the inorganic cementitious material are mixed according to a mass fraction of 1:5-50, the mixture is aggregated into first intermediate particles and then shaken through a shaker to obtain second intermediate particles with a diameter of 2-5 mm, each of the second intermediate particles is then coated with a water-soluble film and the water-soluble film is heated to cause the water-soluble film to closely adhere to the outer surface of the each of the second intermediate particles when the water-soluble film is thermally shrunk to finally obtain the particles.

9. The method as claimed in claim 8, wherein the compound microbial fertilizer is a result of microbial fermentation of manure, marsh or algae residue, medicine residue, distiller's grains, crop stalks, fruit and vegetable waste or/and food residue.

10. The method as claimed in claim 8, wherein the compound microbial strain is a mixed fermentation broth of water, EM bacteria, and one or more of the soybeans, soybean meal, fruits or vegetables.

11. The method as claimed in claim 8, wherein, the steps 1 and 2 require that the 24 hours soil temperature should be between 5° C. and 35° C. and the daytime maximum atmospheric temperature should be between 25° C. and 35° C.

12. The method as claimed in claim 8, wherein, prior to the step 2, the surface of the soil layer is heated with a high-temperature device so that the surface temperature of the soil layer reaches at least 40 degrees Celsius for at least 10 minutes, this can further promote the decomposition of residual ozone in the soil to ensure that the ozone does not remain, to prevent oxidation of compound microbial fertilizer and compound microbial strain.

13. The method as claimed in claim 9, wherein, the steps 1 and 2 require that the 24 hours soil temperature should be between 5° C. and 35° C. and the daytime maximum atmospheric temperature should be between 25° C. and 35° C.

14. The method as claimed in claim 10, wherein, the steps 1 and 2 require that the 24 hours soil temperature should be between 5° C. and 35° C. and the daytime maximum atmospheric temperature should be between 25° C. and 35° C.

15. The method as claimed in claim 9, wherein, prior to the step 2, the surface of the soil layer is heated with a high-temperature device so that the surface temperature of the soil layer reaches at least 40 degrees Celsius for at least 10 minutes, this can further promote the decomposition of residual ozone in the soil to ensure that the ozone does not remain, to prevent oxidation of compound microbial fertilizer and compound microbial strain.

16. The method as claimed in claim 10, wherein, prior to the step 2, the surface of the soil layer is heated with a high-temperature device so that the surface temperature of the soil layer reaches at least 40 degrees Celsius for at least 10 minutes, this can further promote the decomposition of residual ozone in the soil to ensure that the ozone does not remain, to prevent oxidation of compound microbial fertilizer and compound microbial strain.

\* \* \* \* \*